United States Patent [19]
Takii et al.

[11] Patent Number: 5,746,173
[45] Date of Patent: May 5, 1998

[54] DIVIDED COMBUSTION CHAMBER FOR DIESEL ENGINE

[75] Inventors: Osamu Takii; Shuichi Yamada; Akinori Muraoka; Kiyoshi Hataura; Atsushi Yamaguchi; Hideo Hasegawa; Manabu Miyazaki; Hideya Miyazaki, all of Sakai, Japan

[73] Assignee: Kubota Corporation, Osaka, Japan

[21] Appl. No.: 861,759

[22] Filed: May 22, 1997

[30] Foreign Application Priority Data

Sep. 6, 1996 [JP] Japan .................................. 8-236052

[51] Int. Cl.⁶ ......................................................... F02B 19/18
[52] U.S. Cl. ................................................ 123/293; 123/286
[58] Field of Search ................................... 123/269, 286, 123/293

[56] References Cited

FOREIGN PATENT DOCUMENTS

| 3-70812 | 3/1991 | Japan | 123/293 |
| 3-70813 | 3/1991 | Japan | 123/293 |
| 8-49542 | 2/1996 | Japan . | |

*Primary Examiner*—Tony M. Argenbright
*Attorney, Agent, or Firm*—Bacon & Thomas

[57] ABSTRACT

In a divided combustion chamber for diesel engine, a main combustion chamber (2) communicates with a sub-chamber (5) through a communication hole (6), the communication hole (6) being composed of a main communication hole (7) and sub communication holes (8), a pair of sub communication holes (8),(8) being provided in the shape of grooves in opposite right and left peripheral surface portions of the main communication hole (7). Provided at boundaries between a peripheral surface of the main communication hole (7) and peripheral surfaces of the sub communications holes (8),(8) are auxiliary communication grooves (9),(9) smaller than the sub communication holes (8),(8) in width.

6 Claims, 6 Drawing Sheets

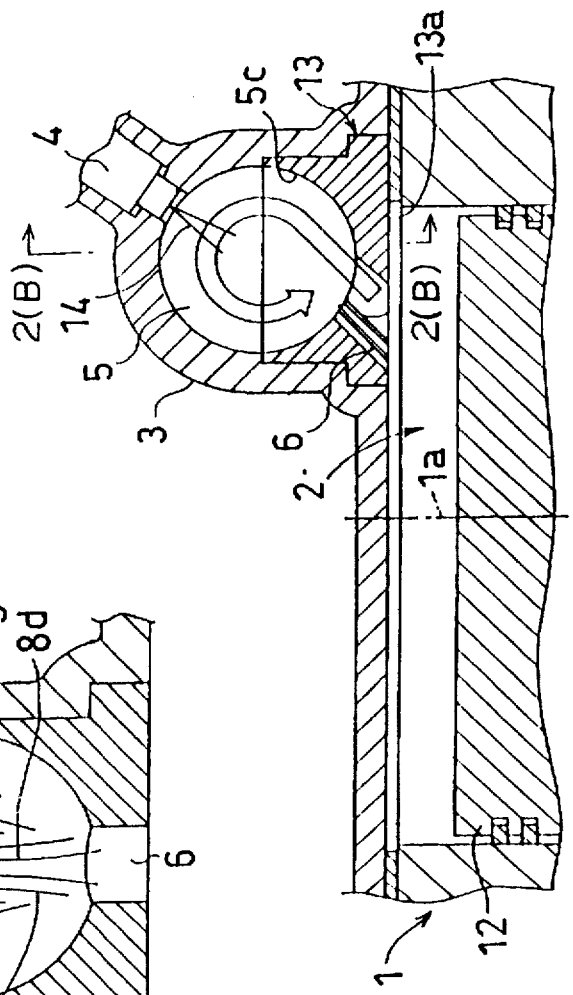
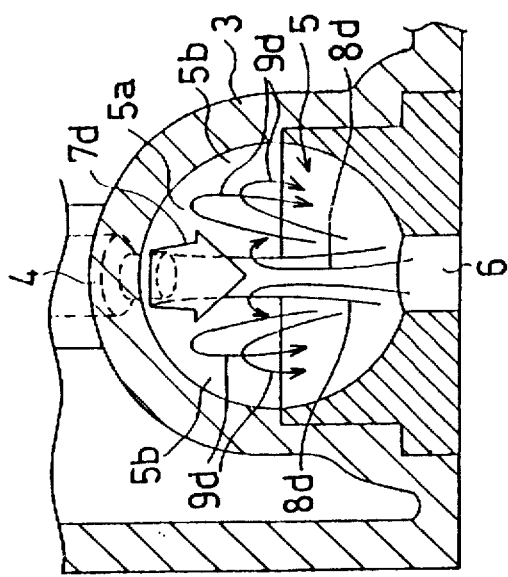
FIG. 2 (A)
FIG. 2 (B)

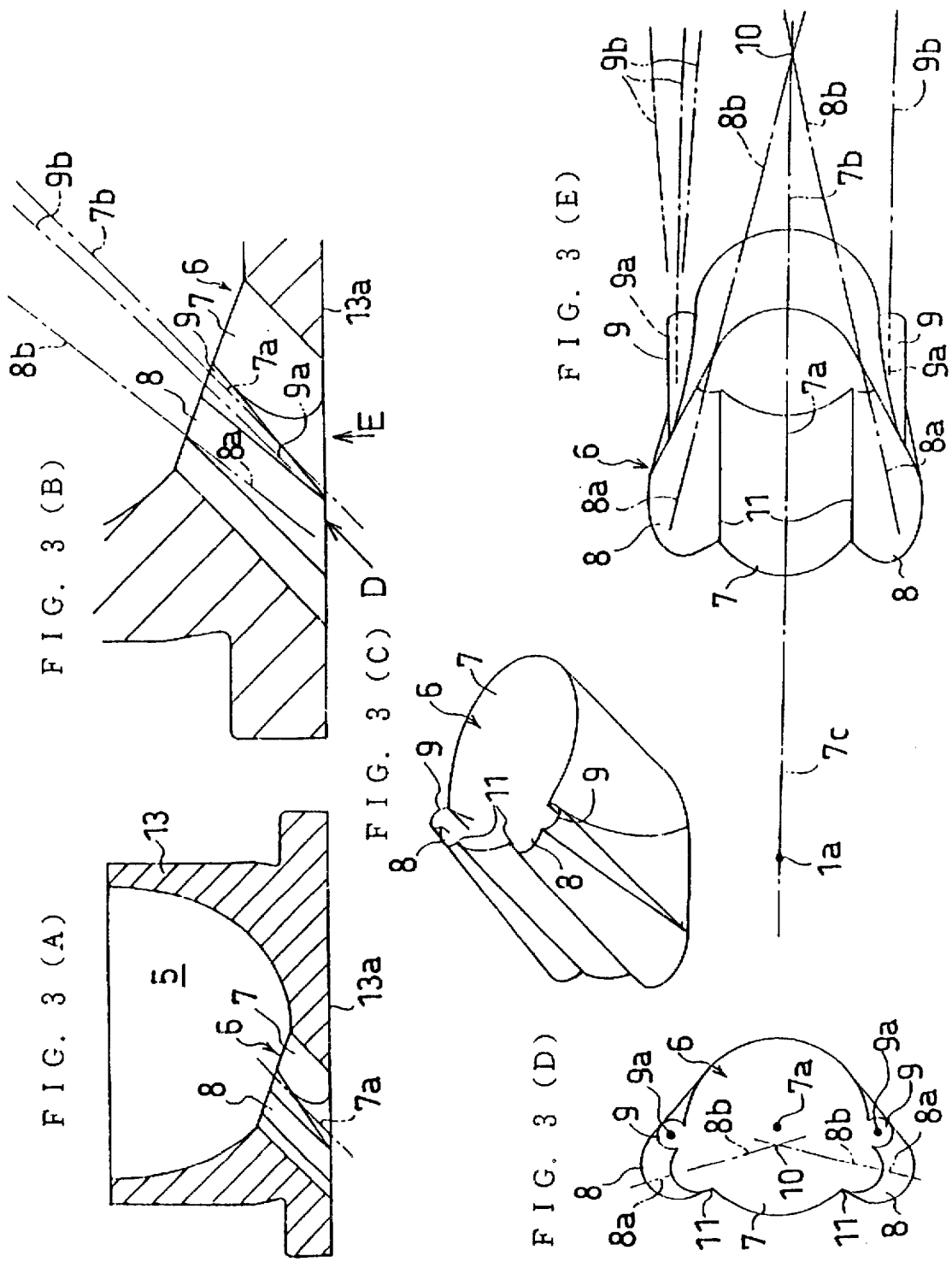

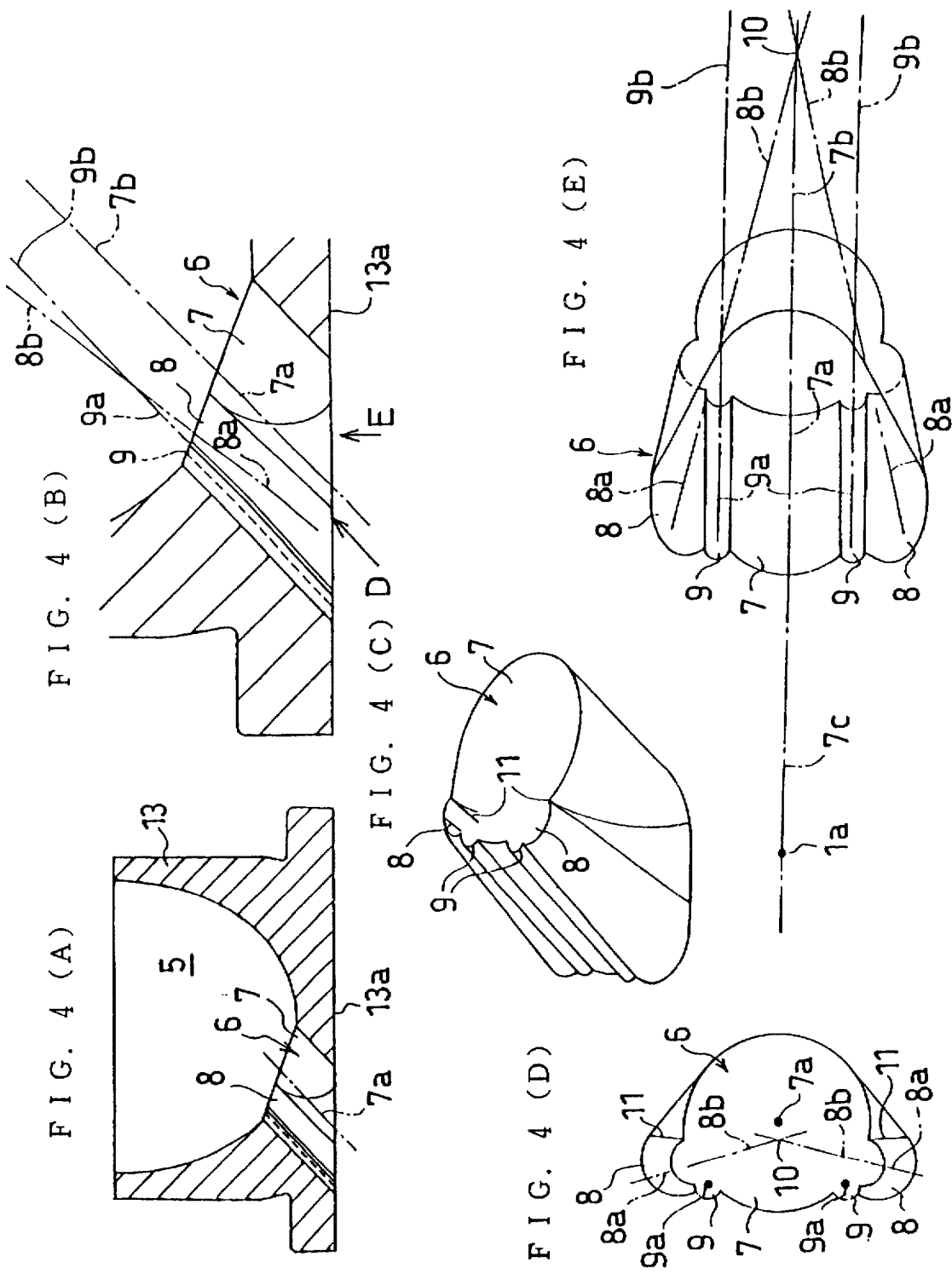

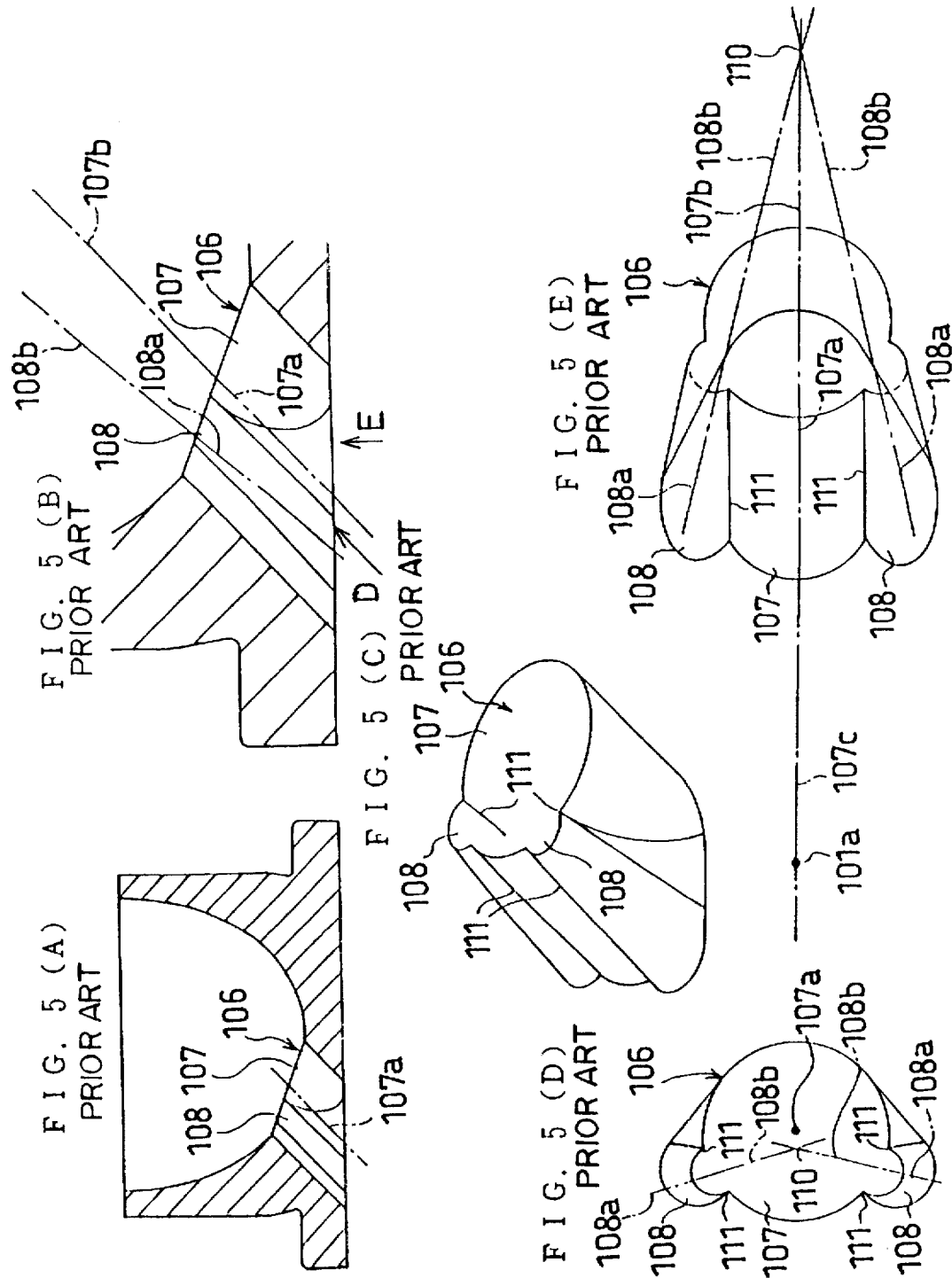

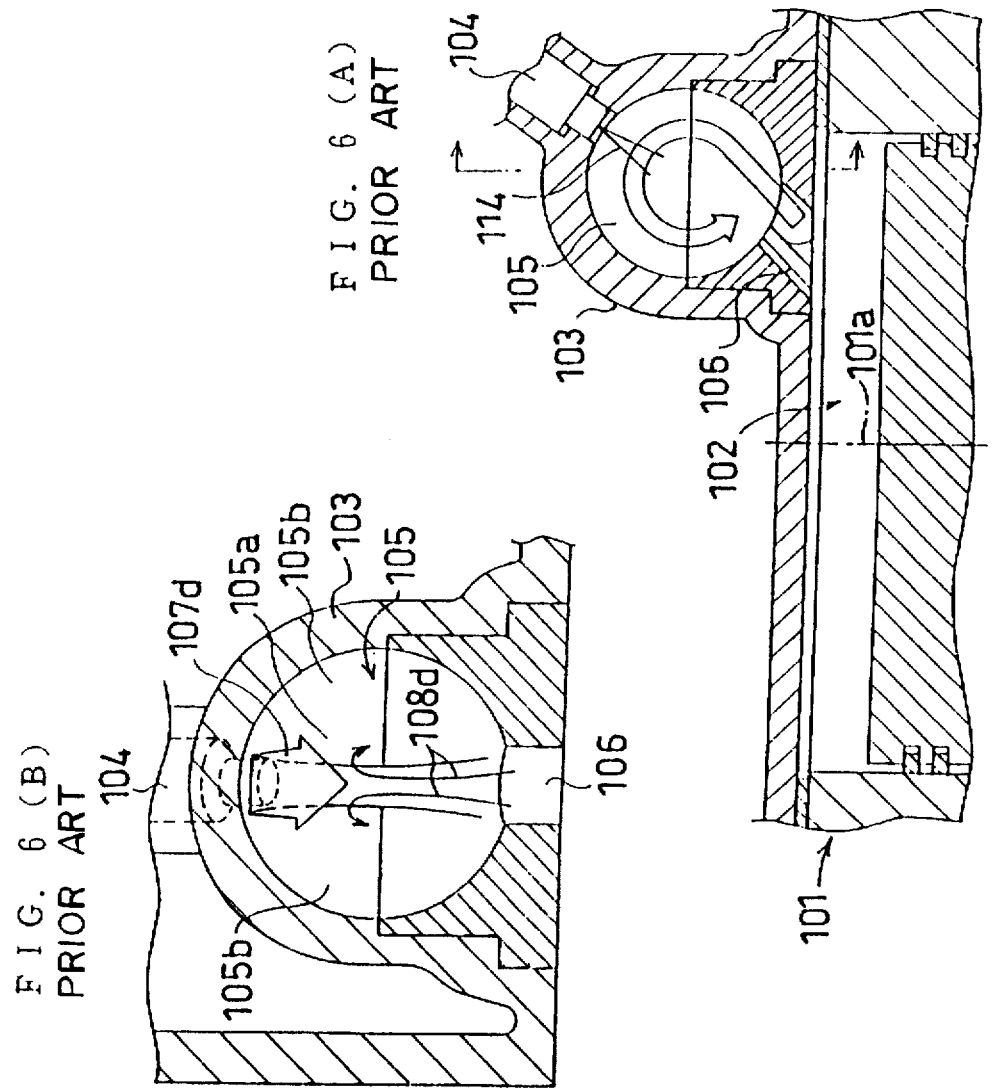

DIVIDED COMBUSTION CHAMBER FOR DIESEL ENGINE

BACKGROUND OF THE INVENTION

1. Field of the Invention

The present invention relates to a divided combustion chamber for diesel engine.

2. Description of Earlier Technology

The inventors of the present invention manufactured such a divided combustion chamber for diesel engine as shown in FIGS. 5 and 6, prior to the present invention.

The earlier divided combustion chamber has been constructed as follows.

As shown in FIG. 6(A), a main combustion chamber 102 is provided in a cylinder 101, and a sub-chamber 105 is provided in a cylinder head 103 with a fuel injection nozzle 104 facing the sub-chamber 105. The main combustion chamber 102 is communicated with the sub-chamber 105 through a communication hole 106. This communication hole 106 is composed of a main communication hole 107 and sub communication holes 108 as shown in FIG. 5.

And as shown in FIG. 5(E), it is constructed as follows, when seen in a direction parallel to a center axis 101a of the cylinder 101.

A pair of sub communication holes 108, 108 are provided in the shape of grooves in opposite right and left peripheral surface portions of the main communication hole 107 with an axis 107a of the main communication hole 7 taken as a center.

While a line 107c extending from the axis 107a toward the main combustion chamber 102 is adapted to pass through a mid portion of the main combustion chamber 102, a line 107b extending from the axis 107a toward the sub-chamber 105 is arranged to pass through a mid portion of the sub-chamber 105.

Further, lines 108b, 108b extending from axes 108a, 108a of the paired sub communication holes 108, 108 toward the sub-chamber 105 are adapted to gradually approach the extending line 107b of the axis 107a of the main communication hole 107 and cross each other at a cross-point 110.

According to the aforesaid technique, as shown in FIG. 5(D), a boundary between a peripheral surface of the main communication hole 107 and a peripheral surface of a sub communication hole 108 is formed like a sharp peak 111.

The earlier technique has the following problem.

As shown in FIG. 6(A), during the compression stroke, air current is introduced from the main combustion chamber 102 to the sub-chamber 105 through the communication hole 106. A main air current portion 107d which has passed through the main communication hole 107 is introduced toward a mid space 105a of the sub-chamber 105 as well as sub air current portions 108d, 108d which have passed through the sub communication holes 108, 108. Thus opposite right and left spaces 105b, 105b of the sub-chamber 105 become stagnant spaces hard to be agitated by the air current, thereby causing an insufficient mixing of air with an injected fuel 114 within the sub-chamber 105 or a failure of combustion. As a result, in some case it is hardly possible to obtain a high output and in the other case unburnt harmful components in the exhaust gas increases in amount.

SUMMARY OF THE INVENTION

The present invention relates to a divided combustion chamber for diesel engine and has an object to provide a divided combustion chamber capable of accelerating the introduction of air current into opposite right and left spaces of a sub-chamber.

The present invention is constructed as follows.

As shown in FIG. 2(A), a main combustion chamber 2 is provided in a cylinder 1, and a sub-chamber 5 is provided in a cylinder head 3 with a fuel injection nozzle 4 facing the sub-chamber 5. The main combustion chamber 2 is communicated with the sub-chamber 5 through a communication hole 6. As shown in FIG. 1, the communication hole 6 is composed of a main communication hole 7 and sub communication holes 8.

And as shown in FIG. 1(E), the following construction is made when seen in a direction parallel to a center axis 1a of the cylinder 1.

A pair of sub communication holes 8, 8 are provided in the shape of grooves in opposite right and left peripheral surface portions of the main communication hole 7 with an axis 7a of the main communication hole 7 taken as a center.

While a line 7c extending from the axis 7a toward the main combustion chamber 2 is adapted to pass through a mid portion of the main combustion chamber 2, a line 7b extending from the axis 7a toward the sub-chamber 5 is arranged to pass through a mid portion of the sub-chamber 5.

Lines 8b, 8b extending from axes 8a, 8a of the paired sub communication holes 8, 8 toward the sub-chamber 5 are adapted to gradually approach the extending line 7b of the axis 7a of the main communication hole 7 and cross each other at a predetermined cross-point 10.

As shown in FIG. 1, provided at boundaries between a peripheral surface of the main communication hole 7 and peripheral surfaces of the sub communication holes 8, 8 are auxiliary communication grooves 9, 9 smaller than the sub communication holes 8, 8 in width.

As shown in FIG. 1(E), the following construction is made when seen in the direction parallel to the cylinder center axis 1a.

With the axis 7a of the main communication hole 7 taken as a center, a line 9b extending toward the sub-chamber 5 from an axis 9a running along a direction in which a left auxiliary communication groove 9 is formed is adapted to pass a left side of the cross-point 10 and a line 9b extending toward the sub-chamber 5 from an axis 9a running along a direction in which a right auxiliary groove is formed is arranged to pass a right side of the cross-point 10.

The foregoing construction presents the following advantages.

As shown in FIG. 2(A), during the compression stroke, air current is introduced from the main combustion chamber 2 to the sub-chamber 5 through the communication hole 6. Though a main air current portion 7d which has passed through the main communication hole 7 is introduced toward a mid space 5a of the sub-chamber 5 as well as sub air current portions 8d, 8d which have passed through the sub communication holes 8, 8 as shown in FIG. 2(B), auxiliary air current portions 9d, 9d which have passed through the auxiliary communication grooves 9, 9 are introduced toward opposite right and left spaces 5b, 5b of the sub-chamber 5. This accelerates the air flow within the spaces 5b, 5b of the sub-chamber 5 to improve the mixing of air with an injected fuel 14 within the sub-chamber 5 and therefore assure a good combustion. As a result, it is possible to attain a high output and reduce the amount of unburnt harmful components in the exhaust gas.

The foregoing construction further presents the following advantage.

During the combustion stroke, unburnt expanded gas is introduced from the sub-chamber 5 to the main combustion chamber 2 through the communication hole 6. While main expanded gas which has passed through the main communication hole 2 is introduced toward a mid space of the main combustion chamber 2 as well as auxiliary expanded gas which has passed through the auxiliary communication grooves 9, 9, sub expanded gas which has passed through the sub communication holes 8, 8 is introduced toward opposite right and left spaces of the main combustion chamber 2. According to the present invention, the auxiliary communication grooves 9, 9 are formed smaller than the sub communication holes 8, 8 in width. This makes it possible to decrease the ratio of the reduction of the amount of the sub expanded gas introduced into the opposite right and left spaces of the main combustion chamber 2, which reduction is caused by the auxiliary communication grooves 9, 9. As such, it is possible to maintain a good mixing of air with the unburnt expanded gas within the opposite right and left spaces of the main combustion chamber 2 and therefore keep a good combustion by decreasing the reduction ratio of the sub expanded gas less than the main expanded gas in the introduced amount.

BRIEF DESCRIPTION OF THE DRAWING

FIG. 1(A) is a vertical sectional view of a mouthpiece; FIG. 1(B) is an enlarged vertical sectional view of a neighboring portion of a communication hole; FIG. 1(C) is a perspective view of the communication hole; FIG. 1(D) is a view of the communication hole when seen from a direction shown by an arrow (D) in FIG. 1(B); and FIG. 1(E) is a view of the communication hole when seen from a direction as shown by an arrow (E) in FIG. 1(B).

FIGS. 2(A) and 2(B) are an explanatory view of the divided combustion chamber according to the first embodiment of the present invention; FIG. 2(A) is a vertical sectional view of a combustion chamber; FIG. 2(B) is a sectional view taken along a line 2(B)—2(B) in FIG. 2(A).

FIGS. 3(A)–3(E) are an explanatory view of a divided combustion chamber according to a second embodiment of the present invention; and FIG. 3(A) through FIG. 3(E) correspond to FIG. 1(A) through FIG. 1(E).

FIGS. 4(A)–4(E) are an explanatory view of a divided combustion chamber according to a third embodiment of the present invention; FIG. 4(A) through FIG. 4(E) correspond to FIG. 1(A) through FIG. 1(E).

FIGS. 5(A)–5(E) are an explanatory view of a divided combustion chamber according to an earlier technology; and FIG. 5(A) through FIG. 5 (E) correspond to FIG. 1(A) through FIG. 1(E).

FIGS. 6(A) and 6(B) are an explanatory view of the divided combustion chamber according to the earlier technology; FIGS. 6(A) and 6(B) correspond to FIGS. 2(A) and 2(B).

DESCRIPTION OF THE PREFERRED EMBODIMENT

Figure 1:
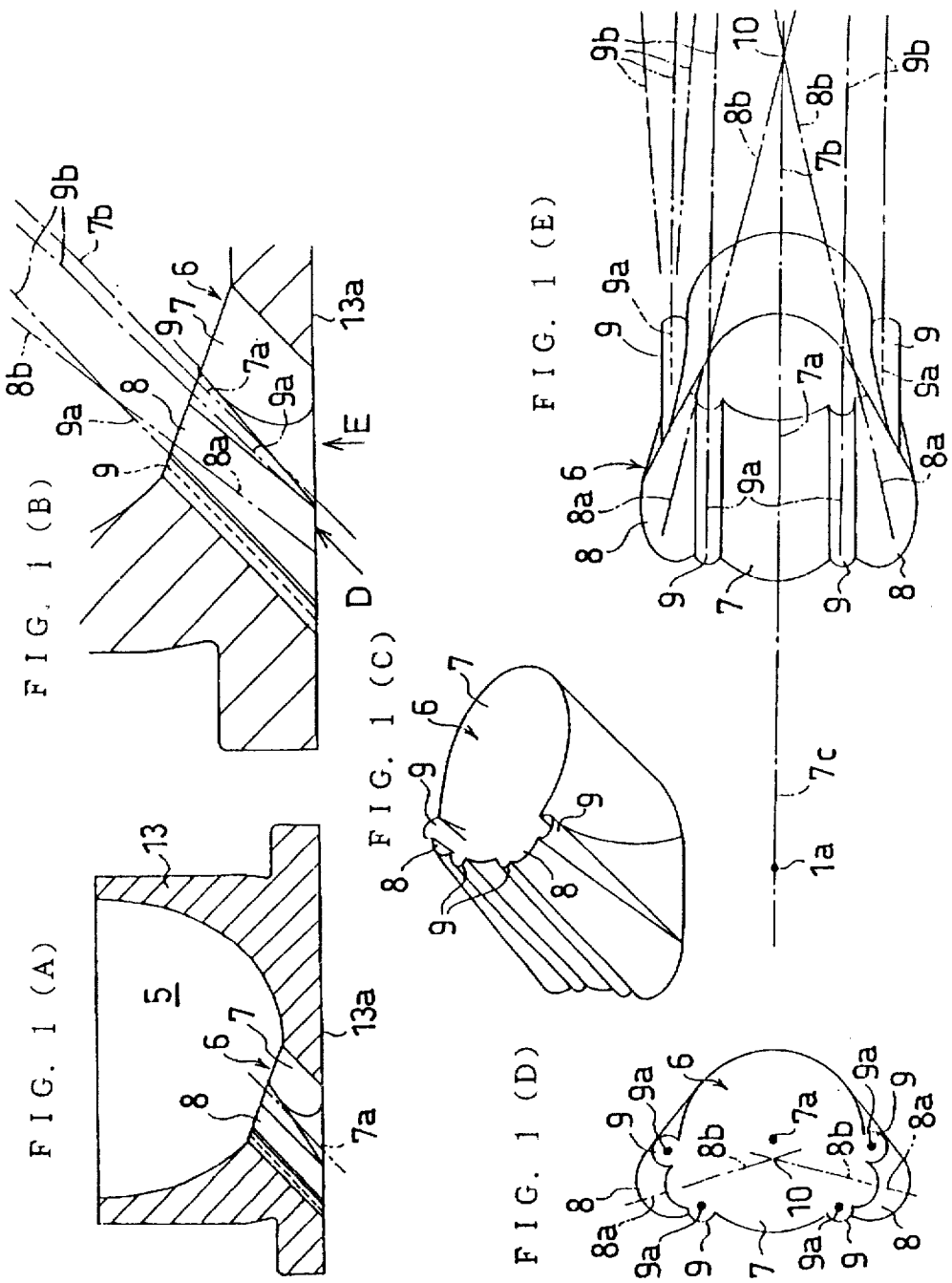
FIGS. 1(A)–1(E) are an explanatory view of a divided combustion chamber according to a first embodiment of the present invention.

Embodiments of the present invention are explained with reference to drawings. FIGS. 1 and 2 are views explaining a divided combustion chamber for diesel engine, according to a first embodiment of the present invention.

This divided combustion chamber is constructed as follows.

As shown in FIG. 2(A), a main combustion chamber 2 is provided in a cylinder 1, and a sub-chamber 5 is provided in a cylinder head 3 with a fuel injection nozzle 4 facing the sub-chamber 5. The main combustion chamber 2 is communicated with the sub-chamber 5 through a communication hole 6. The communication hole 6 is composed of a main communication hole 7 and sub communication holes 8 as shown in FIG. 1.

And as shown in FIG. 1(E), the following construction is made when seen in a direction parallel to an axis 1a of the cylinder 1.

A pair of sub communication holes 8, 8 are provided in the shape of grooves in opposite right and left peripheral surface portions of the main communication hole 7 with an axis 7a of the main communication hole 7 taken as a center.

While a line 7c extending from the axis 7a toward the main combustion chamber 2 is adapted to pass through a mid portion of the main combustion chamber 2, a line 7b extending from the axis 7a toward the sub-chamber 5 is arranged to pass through a mid portion of the sub-chamber 5.

Further, lines 8b, 8b extending from axes 8a, 8a of the paired sub communication holes 8, 8 toward the sub-chamber 5 are adapted to gradually approach the extending line 7b of the axis 7a of the main communication hole 7 and cross each other at a predetermined cross-point 10.

As shown in FIG. 2(A), the main combustion chamber 2 is formed between the cylinder head 3 and a piston 12. The sub-chamber 5 is arranged at a position eccentric to the cylinder center axis 1a and formed in the shape of a sphere. The communication hole 6 is formed in a mouthpiece 13 and directed toward a mid portion of the cylinder 1. The communication hole 6 is also directed toward a spherical surface 5c near to a peripheral wall of the cylinder 1 and inclined in a direction tangent to the spherical surface 5c. The sub-chamber 5 is formed as a swirl chamber. As shown in FIG. 1, the sub communication holes 8 are formed in a pair. As shown in FIG. 1(B), the main communication hole 7 is a columnar hole inclined at an angle of 45 degrees with respect to a bottom surface 13a of the mouthpiece 13 directed perpendicular to the cylinder center axis 1a. Each of the sub communication holes 8 has a peripheral surface tapered so that its sectional area is progressively decreased from the main combustion chamber 2 toward the sub-chamber 5.

In this embodiment, the following construction is made in order to accelerate the introduction of air current into opposite right and left spaces 5b, 5b of the sub-chamber 5.

As shown in FIG. 1, provided at boundaries between a peripheral surface of the main communication hole 7 and peripheral surfaces of the sub communication holes 8, 8 are auxiliary communication grooves 9, 9 smaller than the sub communication holes 8, 8 in width.

As shown in FIG. 1(E), these auxiliary communication grooves 9, 9 are constructed as follows when seen in the direction parallel to the cylinder center axis 1a.

With the axis 7a of the main communication hole 2 taken as a center, a line 9b extending toward the sub-chamber 5 from an axis 9a running along a direction in which a left auxiliary communication groove 9 is formed is adapted to pass a left side of the cross-point 10 and a line 9b extending toward the sub-chamber 5 from an axis 9a running along a direction in which a right auxiliary groove 9 is formed is arranged to pass a right side of the cross-point 10.

The foregoing construction produces the following advantages.

As shown in FIG. 2(A), during the compression stroke, air current is introduced from the main combustion chamber 2 to the sub-chamber 5 through the communication hole 6. Though a main air current portion 7d which has passed through the main communication hole 7 is introduced toward a mid space 5a of the sub-chamber 5 as well as sub air current portions 8d, 8d which have passed through the sub communication holes 8, 8 as shown in FIG. 2(B), auxiliary air current portions 9d, 9d which have passed through the auxiliary communication grooves 9, 9 are introduced toward opposite right and left spaces 5b, 5b of the sub-chamber 5. This accelerates the air flow within the opposite right and left spaces 5b, 5b of the sub-chamber 5, thereby improving the mixing of air with an injected fuel 14 within the sub-chamber 5 and therefore assuring a good combustion. As a result, it is possible to obtain a high output and decrease the amount of unburnt harmful components in the exhaust gas.

The foregoing construction further produces the following advantage.

During the combustion stroke, unburnt expanded gas is introduced from the sub-chamber 5 to the main combustion chamber 2 through the communication hole 6. While main expanded gas which has passed through the main communication hole 2 is introduced toward a mid space of the main combustion chamber 2 as well as auxiliary expanded gas which has passed through auxiliary communication holes 9, 9, sub expanded gas which has passed through sub communication holes 8, 8 is introduced toward opposite right and left spaces of the main combustion chamber 2. In this embodiment, the auxiliary communication grooves 9, 9 are formed smaller than the sub communication holes 8, 8 in width. This makes it possible to decrease the ratio of the reduction of the amount of the sub expanded gas introduced into the opposite right and left spaces of the main combustion chamber 2, which reduction is caused by the auxiliary communication grooves 9, 9. As such, it is possible to maintain a good mixing of air with the unburnt expanded gas within the opposite right and left spaces of the main combustion chamber 2 and therefore keep a good combustion by decreasing the reduction ratio of the sub expanded gas less than the main expanded gas in the introduced amount.

In this embodiment, an inner peripheral surface of each of the main communication hole 7, sub communication holes 8 and auxiliary communication grooves 9 is formed from a part of a peripheral surface of an imaginary body of revolution. An inner peripheral surface of the main communication hole 7 is formed from a part of a peripheral surface of an imaginary column. An inner peripheral surface of each of the sub communication holes 8 is formed from a part of a peripheral surface of an imaginary truncated cone. An inner peripheral surface of each of the auxiliary communication grooves 9 is formed from a part of another imaginary column. And the respective axes of the imaginary body of revolution become the axis 7a of the main communication hole 7, axes 8a of the sub communication holes 8 and axes 9a of the auxiliary communication grooves 9. More specifically, each of the axes 7a, 8a and 9a passes through a center of curvature of each inner peripheral surface of the main communication hole 7, sub communication holes 8 and auxiliary communication grooves 9, respectively.

In this embodiment, the following construction is made so as to introduce the auxiliary air current portions 9d, 9d which have passed through the auxiliary communication grooves 9, 9, into the opposite right and left spaces 5b, 5b of the sub-chamber 5 more efficiently.

As shown in FIG. 1(E), an extending line 9b of an axis 9a of an auxiliary communication groove 9 is oriented in a direction parallel to the extending line 7b of the axis 7a of the main communication hole 7 as shown by an alternate dash and dot chain line, when seen in the direction parallel to the cylinder center axis 1a. The extending line 9b of the axis 9a of the auxiliary communication groove 9 may be inclined outwards from the direction parallel to the extending line 7b of the axis 7a of the main communication hole 7 as shown in an alternate dash and two dots chain line or inclined from the parallel direction toward the center at an angle within a range of 0 to 15 degrees.

According to the above construction, the auxiliary air current portions 9d, 9d which have passed through the auxiliary communication grooves 9, 9 are introduced into the opposite right and left spaces 5b, 5b of the sub-chamber 5 more efficiently, thereby accelerating the air flow within the spaces 5b, 5b of the sub-chamber 5 to result in improving the mixing of air with the injected fuel 14 within the sub-chamber 5 and therefore assuring a more improved combustion.

In this embodiment, in order to introduce slight turbulent flow into the opposite right and left spaces 5b, 5b of the sub-chamber 5, as shown in FIG. 1(E), the axes 9a, 9a of the auxiliary communication grooves 9, 9 are inclined with respect to the directions of the axes 8a, 8a of the sub communication holes 8, 8. According to this construction, since the sub air current portions 8d, 8d pass through the sub communication holes 8, 8 in a direction not parallel to the direction in which the auxiliary air current portions 9d, 9d pass through the auxiliary communication grooves 9, 9, slight turbulent flow is produced at boundaries between the sub communication holes 8 and the auxiliary communication grooves 9 because of friction caused between the sub air current portions 8d, 8d and the auxiliary air current portions 9d, 9d. This slight turbulent flow is introduced into the opposite right and left spaces 5b, 5b of the sub-chamber 5, thereby accelerating the air flow within the spaces 5b, 5b of the sub-chamber 5 to result in improving the mixing of air with the injected fuel 14 within the sub-chamber 5 and assuring a more improved combustion.

In this embodiment, an auxiliary communication groove 9 is constructed larger than a sub communication hole 8 in curvature of peripheral surface. According to this construction, since the auxiliary air current portions 9d, 9d passing through the auxiliary communication grooves 9, 9 flow at a lower speed than the sub air current portions passing through the sub communication holes 8, 8, slight turbulent flow is produced at boundaries between the sub communication holes 8, 8 and the auxiliary communication grooves 9, 9 because of friction caused between the sub air current portions 8d, 8d and the auxiliary air current portions 9d, 9d. This slight turbulent flow is introduced into the opposite right and left spaces 5b, 5b of the sub-chamber 5, thereby accelerating the air flow within the spaces 5b, 5b of the sub-chamber 5 to result in improving the mixing of air with the injected fuel 14 within the sub-chamber 5 and assuring a more improved combustion.

In this embodiment, in order to more efficiently introduce the auxiliary air current portions 9d, 9d which have passed through the auxiliary communication grooves 9, 9, into the opposite right and left spaces 5b, 5b of the sub-chamber 5, as shown in FIG. 1(E), there being two pairs of boundaries between the peripheral surface of the main communication hole 7 and the peripheral surfaces of the paired sub communication holes 8, 8, the auxiliary communication grooves 9, 9 are formed at one pair of boundaries positioned outward with the axis 7a of the main communication hole 7 taken as a center, when seen in the direction parallel to the cylinder center axis 1a.

According to the above construction, the auxiliary communication grooves 9, 9 are arranged outwards, so that the auxiliary air current portions 9d, 9d passing through the auxiliary communication grooves 9, 9 are more efficiently introduced into the opposite right and left spaces 5b, 5b of the sub-chamber 5. This accelerates the air flow within the spaces 5b, 5b of the sub-chamber 5 to result in improving the mixing of air with the injected fuel 14 within the sub-chamber 5 and therefore assuring a more improved combustion.

In this embodiment, the auxiliary communication grooves 9, 9 are also formed at the other pair of boundaries positioned near to the center.

According to this construction, the auxiliary communication grooves 9, 9 are also arranged near to the center, so that the auxiliary air current portions 9d, 9d passing through the auxiliary communication grooves 9, 9 are more efficiently introduced into the opposite right and left spaces 5b, 5b of the sub-chamber 5. This accelerates the air flow within the spaces 5b, 5b of the sub-chamber 5 to result in improving the mixing of air with the injected fuel 14 within the sub-chamber 5 and therefore assuring a more improved combustion.

FIG. 3 is a view explaining a second embodiment of the present invention. In this second embodiment, the auxiliary communication grooves 9, 9 are formed only at one pair of boundaries positioned outwards and sharp peaks 11 are left as they are at the other pair of boundaries positioned near to the center. Further, FIG. 4 is a view explaining a third embodiment of the present invention. In this third embodiment, the auxiliary communication grooves 9, 9 are formed only at the other pair of boundaries positioned near to the center and sharp peaks 11 are left as they are at one pair of boundaries positioned outwards. The other structures are the same as those of the first embodiment. In FIGS. 3 and 4 the same elements as those of the first embodiment are designated by the same numerals.

What is claimed is:

1. A divided combustion chamber for diesel engine, comprising a cylinder (1) in which a main combustion chamber (2) is provided, a sub-chamber (5) being provided in a cylinder head (3) with a fuel injection nozzle (4) facing the sub-chamber (5), the main combustion chamber (2) being communicated with the sub-chamber (5) through a communication hole (6), the communication hole (6) being composed of a main communication hole (7) and sub communication holes (8), when seen in a direction parallel to a center axis (1a) of the cylinder (1), a pair of sub communication holes (8),(8) being provided in the shape of grooves in opposite right and left peripheral surface portions of the main communication hole (7) with an axis (7a) of the main communication hole (7) taken as a center, a line (7c) extending from the axis (7a) toward the main combustion chamber (2) being adapted to pass through a mid portion of the main combustion chamber (2) and a line (7b) extending from the axis (7a) toward the sub-chamber (5) being arranged to pass through a mid portion of the sub-chamber (5), lines (8b),(8b) extending from axes (8a),(8a) of the paired sub communication holes (8),(8) toward the sub-chamber (5) being adapted to gradually approach the extending line (7b) of the axis (7a) of the main communication hole (7) and cross each other at a redetermined cross-point (10), wherein provided at boundaries between a peripheral surface of the main communication hole (7) and peripheral surfaces of the sub communication holes (8),(8) are auxiliary communication grooves (9),(9) smaller than the sub communication holes (8),(8) in width, and when seen in the direction parallel to the cylinder center axis (1a), with the axis (7a) of the main communication hole (7) taken as a center, a line (9b) extending toward the sub-chamber (5) from an axis (9a) running along a direction in which a left auxiliary communication groove (9) is formed is adapted to pass a left side of the cross-point (10) and a line (9b) extending toward the sub-chamber (5) from an axis (9a) running along a direction in which a right auxiliary communication groove (9) is formed is arranged to pass through a right side of the cross-point (10).

2. A divided combustion chamber for diesel engine as set forth in claim 1, wherein when seen in the direction parallel to the cylinder center axis (1a), the extending line (9b) of the axis (9a) of the auxiliary communication groove (9) is oriented in a direction parallel to the extending line (7b) of the axis (7a) of the main communication hole (7) or inclined either outwards from the parallel direction or toward the center from the parallel direction at an angle within a range of 0 to 15 degrees.

3. A divided combustion chamber for diesel engine as set forth in claim 1, wherein the axes (9a),(9a) of the auxiliary communication grooves (9),(9) are inclined with respect to the directions of the axes (8a),(8a) of the sub communication holes (8),(8).

4. A divided combustion chamber for diesel engine as set forth in claim 1, wherein an auxiliary communication groove (9) is constructed larger than a sub communication hole (8) in curvature of peripheral surface.

5. A divided combustion chamber for diesel engine as set forth in claim 1, wherein there being two pairs of boundaries between the peripheral surface of the main communication hole (7) and the peripheral surfaces of the paired sub communication holes (8),(8), the auxiliary communication grooves (9),(9) are formed at one pair of boundaries positioned outwards with the axis (7a) of the main communication hole (7) taken as a center, when seen in the direction parallel to the cylinder center axis (1a).

6. A divided combustion chamber for diesel engine as set forth in claim 5, wherein the auxiliary communication grooves (9),(9) are also formed at the other pair of boundaries positioned near to the center.

* * * * *